United States Patent
Sakai et al.

(10) Patent No.: US 7,390,058 B2
(45) Date of Patent: Jun. 24, 2008

(54) HEADREST APPARATUS FOR VEHICLE

(75) Inventors: Morio Sakai, Toyota (JP); Kiyoka Matsubayashi, Aichi-gun (JP)

(73) Assignees: Aisin Seiki Kabushiki Kaisha, Kariya-Shi, Aichi-Ken (JP); Toyota Jidosha Kabushiki Kaisha, Toyota-Shi, Aichi-Ken (JP)

( * ) Notice: Subject to any disclaimer, the term of this patent is extended or adjusted under 35 U.S.C. 154(b) by 0 days.

(21) Appl. No.: 11/508,946

(22) Filed: Aug. 24, 2006

(65) Prior Publication Data

US 2007/0052265 A1 Mar. 8, 2007

(30) Foreign Application Priority Data

Aug. 25, 2005 (JP) ............... 2005-244713

(51) Int. Cl.
*B60N 2/42* (2006.01)
(52) U.S. Cl. .................................. 297/216.12
(58) Field of Classification Search ............ 297/216.12
See application file for complete search history.

(56) References Cited

U.S. PATENT DOCUMENTS

| | | | |
|---|---|---|---|
| 5,694,320 A | 12/1997 | Breed | |
| 6,082,817 A * | 7/2000 | Muller | 297/216.12 |
| 6,213,548 B1 * | 4/2001 | Van Wynsberghe et al. | 297/216.12 |
| 6,550,856 B1 * | 4/2003 | Ganser et al. | 297/216.12 X |
| 6,623,073 B2 * | 9/2003 | Schafer et al. | 297/216.12 |
| 6,688,697 B2 * | 2/2004 | Baumann et al. | 297/216.12 X |
| 6,715,829 B2 * | 4/2004 | Svantesson et al. | 297/216.12 |
| 6,746,078 B2 | 6/2004 | Breed | |
| 6,761,403 B2 | 7/2004 | Pal et al. | |
| 6,863,343 B2 * | 3/2005 | Pal et al. | 297/216.12 |
| 6,890,028 B2 * | 5/2005 | Pal et al. | 297/216.12 |
| 7,048,334 B2 * | 5/2006 | Pal et al. | 297/216.12 |
| 7,070,205 B2 * | 7/2006 | Becker et al. | 297/216.12 X |
| 7,070,235 B2 * | 7/2006 | Schilling et al. | 297/216.12 |
| 7,073,856 B2 * | 7/2006 | Akaike et al. | 297/216.12 |
| 7,108,320 B2 * | 9/2006 | Schafer et al. | 297/216.12 |
| 7,111,901 B2 * | 9/2006 | Schlierf et al. | 297/216.12 |
| 7,195,313 B2 * | 3/2007 | Hippel et al. | 297/216.12 |
| 2001/0040396 A1 * | 11/2001 | Kreuels et al. | 297/216.12 |
| 2005/0077762 A1 * | 4/2005 | Kraemer et al. | 297/216.12 |

FOREIGN PATENT DOCUMENTS

| | | |
|---|---|---|
| JP | 2000-211410 | 8/2000 |
| JP | 2003-54343 | 2/2003 |
| JP | 2005-087650 | 4/2005 |

* cited by examiner

*Primary Examiner*—Rodney B. White
(74) *Attorney, Agent, or Firm*—Buchanan Ingersoll & Rooney PC

(57) ABSTRACT

A headrest apparatus for a vehicle includes a headrest rear portion supported by a seatback, a headrest front portion movable between a fully closed position in which the headrest front portion is close to the headrest rear portion, and a fully open position in which the headrest front portion is away from the headrest rear portion, a driving means for moving the headrest front portion, and a controlling means for controlling the driving means so as to move the headrest front portion. The controlling means is configured to control the driving means so as to move the headrest front portion to the fully closed position at a predetermined timing.

12 Claims, 3 Drawing Sheets

HEADREST APPARATUS FOR VEHICLE

CROSS REFERENCE TO RELATED APPLICATIONS

This application is based on and claims priority under 35 U.S.C. § 119 to Japanese Patent Application No. 2005-244713, filed on Aug. 25, 2005, the entire content of which is incorporated herein by reference.

FIELD OF THE INVENTION

This invention generally relates to a headrest apparatus for a vehicle.

BACKGROUND

A known seat for a vehicle is equipped with a mechanism for moving a headrest in a vehicle's forward direction for the purposes of protecting the head of a seated occupant in the event of a rear end collision. Such vehicle seat is disclosed in JP2000-211410A and JP2003-54343A.

When an impact is applied to a vehicle from the rear, an upper body of a seated occupant is restrained onto a seatback by means of a seatbelt. However, the head of the occupant that is not restrained may be hurled forward and then be shifted rearward because of a reaction force. At that time, the neck of the occupant may receive the impact. Then, in this case, the headrest is brought to move in a vehicle's forward direction relative to the seatback for the purpose of protecting the head of the seated occupant, thereby reducing the impact applied to the neck of the occupant.

According to the recent headrest apparatus, a possibility of a collision is determined on the basis of a detection result of a distance from a following vehicle, for example. Then, if the possibility of a collision is high, the headrest is driven to move so as to be ready for the eventual collision. Such headrest apparatus requires moving the headrest back to an original position (i.e. fully closed position) in the cases where the collision is avoided, for the purpose of resuming a normal driving. Thus, a structure is proposed for moving the headrest in the vehicle's forward direction by means of an electric driving means such as a motor, and then retracting the headrest to a fully closed position.

However, due to an inadvertent use of the headrest by a user during normal operation of a vehicle, the headrest may not be fully retracted, i.e. not in the fully closed position. In addition, a deterioration of the apparatus such as a decrease of a motor ability may cause the headrest not to be fully retracted.

Since the headrest is constituted to operate in the event of a rear end collision, the headrest is required to automatically return to the fully closed position for the normal driving state. Then, a position sensor, a switch, and the like may be provided for detecting a position of the headrest. When it is detected that the headrest is not fully retracted, i.e. not in the fully closed position, it is considered that the headrest may be brought to move to the fully closed position. However, in this case, a cost increase is inevitable due to an increase of parts such as the position sensor and the switch. In addition, since accuracy is required for the position sensor, the switch, and the like in terms of detection of the position of the headrest, a structure of the apparatus may be complicated.

Thus, a need exists for a headrest apparatus for a vehicle that can relocate a not fully retracted headrest front portion to the fully closed position without increasing the number of parts.

SUMMARY OF THE INVENTION

According to an aspect of the present invention, a headrest apparatus for a vehicle includes a headrest rear portion supported by a seatback, a headrest front portion movable between a fully closed position in which the headrest front portion is close to the headrest rear portion, and a fully open position in which the headrest front portion is away from the headrest rear portion, a driving means for moving the headrest front portion, and a controlling means for controlling the driving means so as to move the headrest front portion. The controlling means is configured to control the driving means so as to move the headrest front portion to the fully closed position at a predetermined timing.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
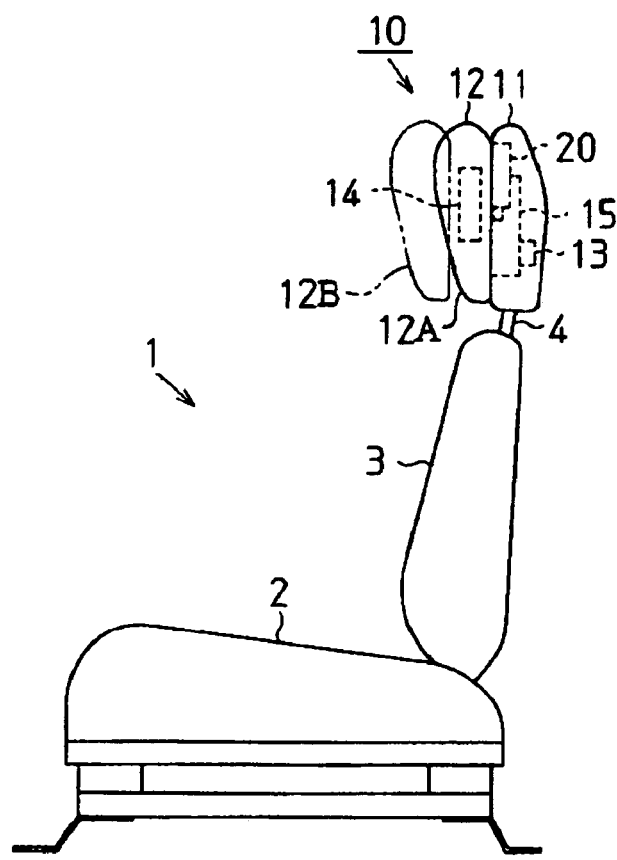
FIG. 1 is a side view of a vehicle seat to which a headrest for a vehicle applied to a present invention.

An embodiment of the present invention is explained with reference to the attached drawings. FIG. 1 is a side view of a vehicle seat 1 to which a headrest for a vehicle according to the present invention is applied. The vehicle seat 1 is arranged on a passenger seat side of a vehicle. As shown in FIG. 1, the vehicle seat 1 includes a seat cushion 2, a seatback 3 supported by the seat cushion 2 so as to be tiltable relative to the seat cushion 2, and a headrest apparatus 10 for a vehicle.

The headrest apparatus 10 includes a headrest rear portion 11, a headrest front portion 12, a motor 13 serving as a driving means for moving the headrest front portion 12, a head portion detecting sensor 14, and an ECU (Electronic Control Unit) 20 serving as a controlling means for controlling the driving of the motor 13.

As shown in FIG. 1, the headrest rear portion 11 is supported by a headrest stay 4 provided on a top end portion of the seatback 3. The headrest front portion 12 is movable between a fully closed position 12A shown by a solid line in FIG. 1 in which the headrest front portion 12 is close to or makes contact with the headrest rear portion 11, and a fully open position 12B shown by a chain double-dashed line in FIG. 1 in which the headrest front portion 12 is away from the headrest rear portion 11. While a vehicle is in a usual moving state, the headrest front portion 12 is in the fully closed position 12A.

A driving mechanism 15 is arranged between the headrest rear portion 11 and the headrest front portion 12. The driving mechanism 15 is elongated or retracted by the driving of the motor 13 so that the headrest front portion 12 is able to move close to or move away from the headrest rear portion 11.

The head portion detecting sensor 14 detects if the head of an occupant seated on the vehicle seat 1 makes contact with the headrest front portion 12. The head portion detecting sensor 14 is constituted by a touch sensor, or the like and is provided on a front face of the headrest front portion 12.

The ECU 20 controls the motor 13 in such a manner that the headrest front portion 12 moves from the fully closed position 12A towards the fully open position 12B in the event of a rear end collision and then returns to the original fully closed position 12A.

In addition, the ECU 20 detects, on the basis of a signal detected by the head portion detecting sensor 14, a contact state between the head portion detecting sensor 14 and the head of an occupant. Further, at a time that the ECU 20 brings the headrest front portion 12 to move towards the fully open position 12B, the ECU 20 stops the movement of the headrest front portion 12 based on a detected signal from the head portion detecting sensor 14 when a location of the head of an occupant is detected. When a location of the head of the occupant is not detected, the ECU 20 brings the headrest front portion 12 to move up to the fully open position 12B.

Figure 2A:
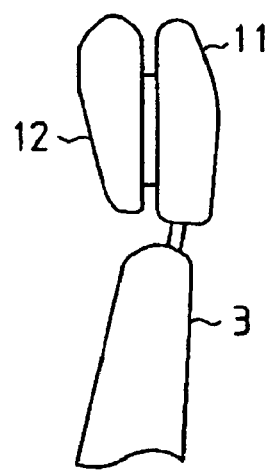
FIGS. 2A and 2B are views for explaining a retracting operation of a headrest front portion.
Figure 2B:
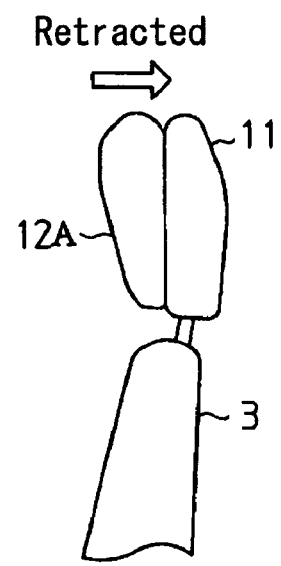

The ECU 20 controls the motor 13 so that the headrest front portion 12 moves to the fully closed position 12A at a predetermined timing. For example, when the headrest front portion 12 is not fully retracted as shown in FIG. 2A, the motor 13 is driven so as to move the headrest front portion 12 to the fully closed position 12A. Accordingly, the headrest front portion 12 is retracted to the fully closed position 12A as shown in FIG. 2B.

According to the present embodiment, each time when the number of times power is supplied to the headrest apparatus 10 exceeds a predetermined value, the ECU 20 controls the motor 13 in such a manner that the headrest front portion 12 moves to the fully closed position 12A. The predetermined value is appropriately specified so as to return the headrest front portion 12 to the fully closed position 12A. For example, if a deterioration of the apparatus is proceeding, the value may increase so as to surely return the headrest front portion 12 to the fully closed position 12A.

Further, according to the present embodiment, the ECU 20 controls the motor 13 so that the headrest front portion 12 moves to the fully closed position 12A after the headrest front portion 12 is brought to move towards the fully open position 12B and then towards the fully closed position 12A. Precisely, when the power is supplied to the headrest apparatus 10, the ECU 20 determines whether or not the headrest front portion 12 was operated (i.e. moved forward and rearward) the last time the power was supplied to the headrest apparatus 10. When it is determined that the headrest front portion 12 was operated last time, the ECU 20 controls the motor 13 so that the headrest front portion 12 moves to the fully closed position 12A.

Figure 3:
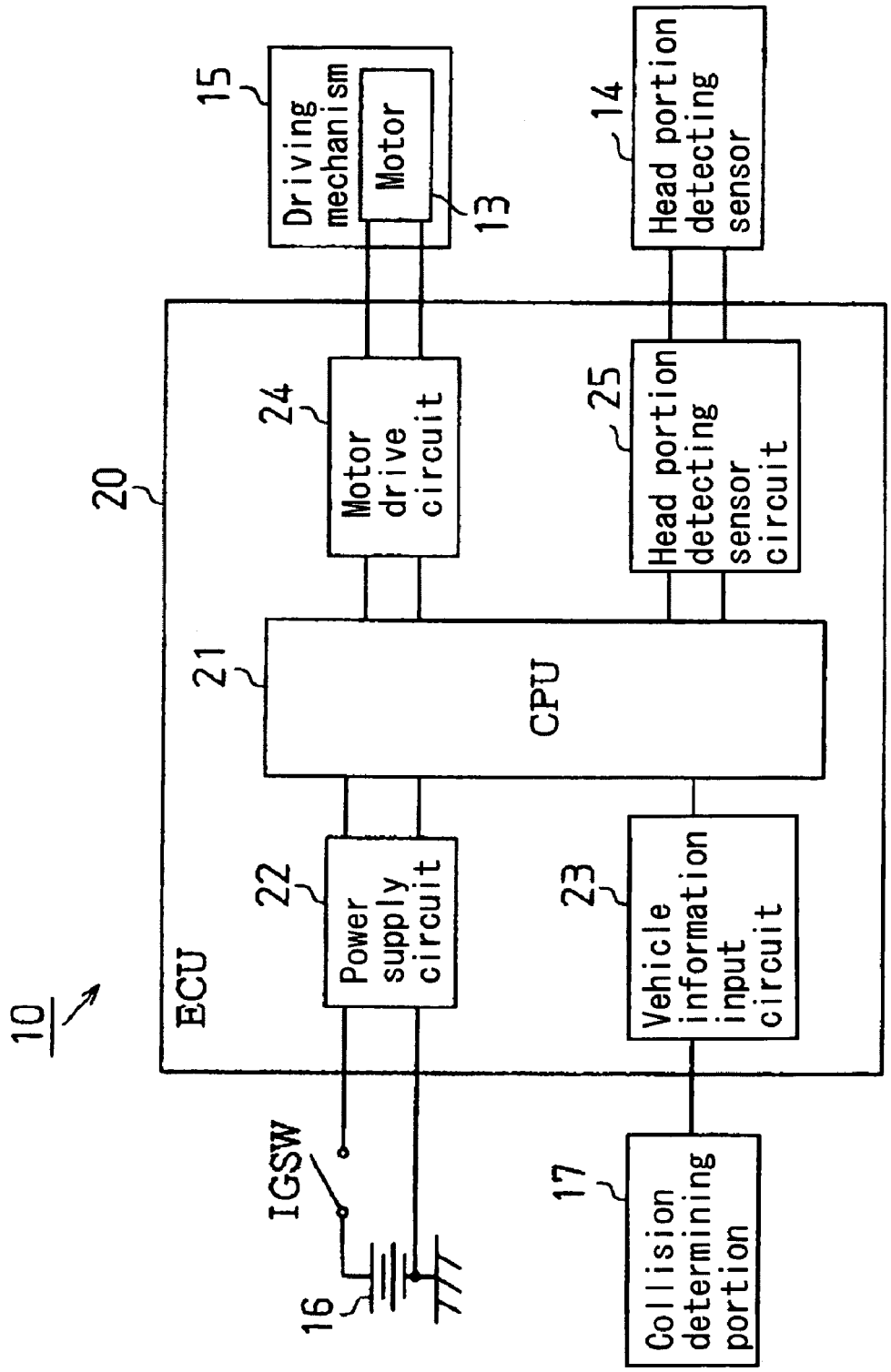
FIG. 3 is a block diagram of an electric structure of a headrest apparatus for a vehicle.

Next, an electrical structure of the headrest apparatus 10 for a vehicle is explained below. As shown in FIG. 3, the headrest apparatus 10 includes the ECU 20, the motor 13 connected to the ECU 20, the head portion detecting sensor 14, a power supply unit 16, a collision determining portion 17 (rear-end collision determining means), and the like.

The ECU 20 includes a CPU 21, a power supply circuit 22 connected to the CPU 21, a vehicle information input circuit 23, a motor drive circuit 24, a head portion detecting sensor circuit 25, and the like.

The CPU 21 is electrically connected to the power supply unit 16 via an ignition switch (IGSW). When the ignition switch is turned on, the power is supplied from the power supply unit 16 through the power supply circuit 22. The headrest apparatus 10 is powered each time the ignition switch is turned on. According to the present embodiment, the CPU 21 incorporates a counter for counting the number of times of turning on the ignition switch.

Further, the CPU 21 inputs a vehicle information such as a vehicle approach from the rear from the collision determining portion 17 through the vehicle information input circuit 23. The collision determining portion 17 is connected to a radar (not shown) provided at a bumper on a rear portion of a vehicle. The collision determining portion 17 inputs a signal from the radar to comprehensively evaluate a relative speed and a distance to a following vehicle, and a speed of a present vehicle. The CPU 21 determines whether or not the following vehicle has collided against the present vehicle, or whether or not the following vehicle is about to collide against the present vehicle. Then, that determination result is output to the vehicle information input circuit 23. The CPU 21 is connected to the motor 13 by means of the motor drive circuit 24 so as to drive the motor 13 by controlling the motor drive circuit 24.

The CPU 21 is also connected to the head portion detecting sensor 14 via the head portion detecting sensor circuit 25 so as to input a signal detected by the head portion detecting sensor 14. Then, the CPU 21 determines whether or not the head of an occupant is detected. A process performed by the ECU 20 of the headrest apparatus 10 for a vehicle is explained below.

Figure 4:
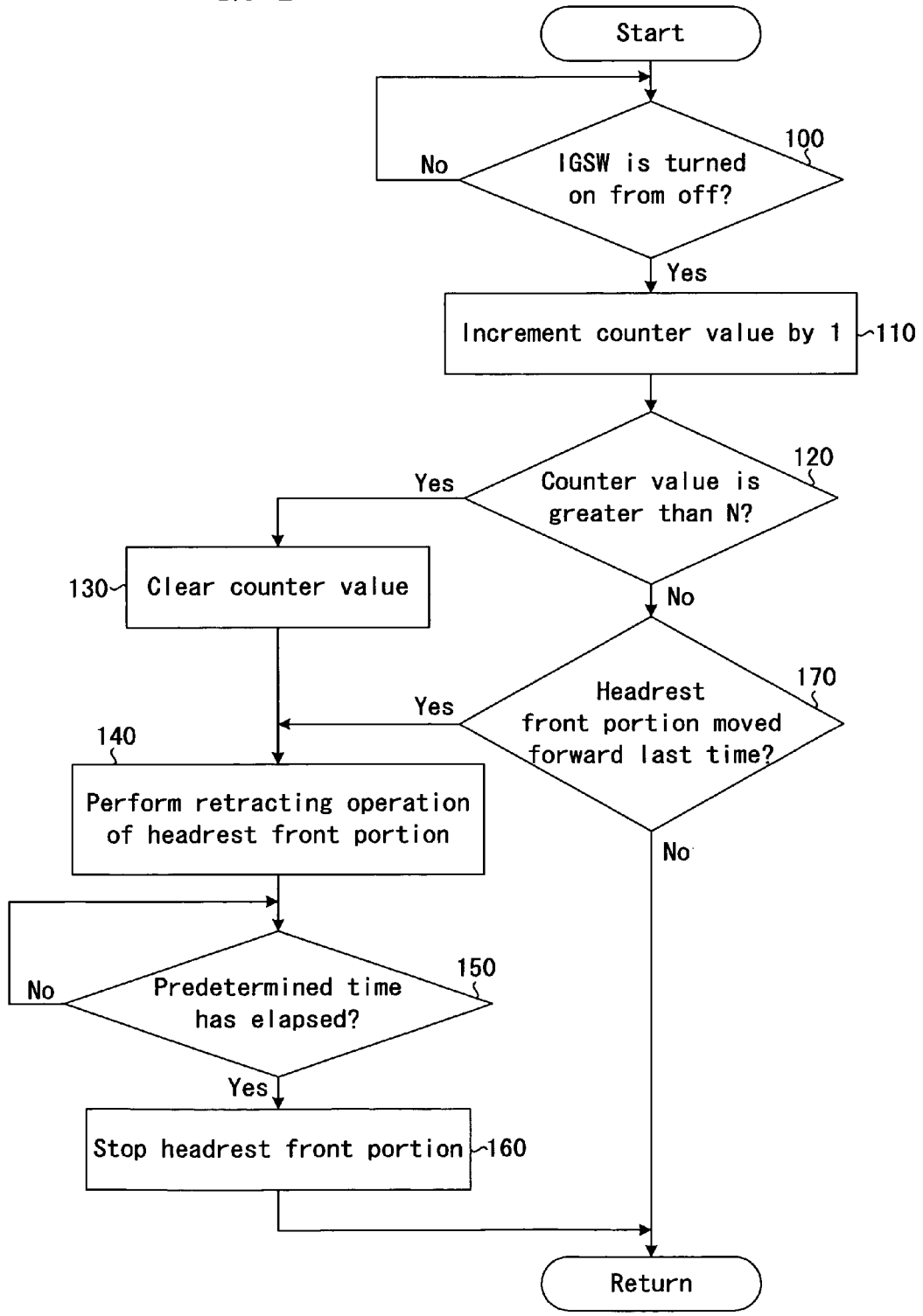
FIG. 4 is a flowchart for explaining a process performed by the headrest apparatus for a vehicle.

As shown in FIG. 4, the CPU 21 determines whether or not the ignition switch is turned on (from off) in Step 100. When the ignition switch is not turned on, the CPU 21 repeats the process of Step 100. When the ignition switch is turned on, the CPU 21 proceeds to Step 110 in which the counter for counting the number of times of turning on the ignition switch is incremented by one.

Next, the CPU 21 proceeds to Step 120 in which it is determined whether or not a counter value of the counter, i.e. the number of times of turning on the ignition switch, exceeds a predetermined value (i.e. N value). When the counter value exceeds the N value, the CPU 21 proceeds to Step 130 in which the counter value is cleared. The CPU 21 then proceeds to Step 140 in which the headrest front portion 12 moves rearward so that a retracting operation is started. That is, the CPU 21 performs the retracting operation of the headrest front portion 12 when the number of times of turning on the ignition switch exceeds the N value.

Afterwards, the CPU 21 proceeds to Step 150 in which it is determined whether or not a predetermined time has elapsed after the movement of the headrest front portion 12. When the predetermined time has not elapsed, the CPU 21 repeats the process of Step 150. When the predetermined time has elapsed, the CPU 21 proceeds to Step 160 in which the headrest front portion 12 is brought to stop. The current process is terminated accordingly. The predetermined time is specified on the basis of an assumed distance from the headrest front portion 12 to the fully closed position 12A.

Meanwhile, when it is determined that the counter value is equal to or less than the N value in Step 120, the CPU 21 proceeds to Step 170 in which it is determined whether or not the headrest front portion 12 moved forward (i.e. towards the fully open position 12B) the last time the power was supplied to the headrest apparatus 10. When it is determined that the headrest front portion 12 moved in the forward direction last time, the CPU 21 performs the process from Step 140 through Step 160. That is, even if the number of times of turning on the ignition switch does not exceed the N value, the CPU 21 performs the retracting operation of the headrest front portion 12 as long as the headrest front portion 12 was operated the last time the power was supplied to the headrest apparatus 10. When it is determined that the headrest front portion 12 did not move in the forward direction last time, the CPU 21 terminates the current process.

While the ignition switch of a vehicle is in an ON position, the ECU repeats the process from Step 100 to Step 170. According to the present embodiment, the following effects can be obtained.

The motor 13 is driven so as to move the headrest front portion 12 to the fully closed position 12A each time when the number of times the power is supplied to the headrest apparatus 10 exceeds the N value, and each time the headrest front portion 12 is operated. Thus, even if the headrest front portion 12 is not fully retracted, the headrest front portion 12 is appropriately brought to move to the fully closed position 12A. Further, the headrest front portion 12 returns to the fully closed position 12A correctly by the motor 13 driven so as to move the headrest front portion 12. Thus, a part for detecting a position of the headrest front portion 12 and the like is not required, thereby relocating the retracted headrest front portion 12 to the fully closed position 12A without increasing the number of parts.

In addition, the motor 13 is driven so as to move the headrest front portion 12 to the fully closed position 12A each time when the number of times the power is supplied to the headrest apparatus 10 exceeds the N value. Thus, the motor 13 is driven the appropriate number of times in response to an operation condition of the headrest front portion 12 so as to relocate the headrest front portion 12 to the fully closed position 12A. Further, the motor 13 is driven the required number of times, thereby increasing durability of the headrest apparatus 10.

Further, the motor 13 is driven so as to move the headrest front portion 12 to the fully closed position 12A each time the headrest front portion 12 is operated. Thus, the headrest front portion 12 can be prevented from failing to retract to the fully closed position 12A that is resulted from the forward and rearward operation of the headrest front portion 12.

Furthermore, according to the aforementioned embodiment, the power supply to the headrest apparatus 10 is performed by an operation of the ignition switch. Thus, the headrest front portion 12 can return to the fully closed position without the increase of parts.

Furthermore, according to the aforementioned embodiment, the headrest front portion 12 can return to the fully closed position in a simple way by counting the number of times of turning on the ignition switch.

Furthermore, according to the aforementioned embodiment, in the cases where the number of times of turning on the ignition switch does not exceed the predetermined value (N value) and the headrest front portion 12 was operated previously, the headrest front portion 12 retracts to the fully closed position 12A. Thus, as long as the headrest front portion 12 was operated previously even though the number of times of turning on the ignition switch does not exceed the predetermined value, the headrest front portion 12 retracts to the fully closed position 12A.

Furthermore, according to the aforementioned embodiment, the head portion detecting sensor 14 is arranged on the headrest front portion 12 for the purposes of detecting whether or not the head of an occupant seated on a vehicle seat makes contact with the headrest front portion 12. Then, the ECU 20 stops the movement of the headrest front portion 12 when the head is detected, thereby assuring the detection of the head portion of an occupant by the head portion detecting sensor 14. In the cases where the head portion is detected by the head portion detecting sensor 14, the movement of the headrest front portion 12 for protecting the head portion can be surely stopped.

Furthermore, according to the aforementioned embodiment, configuring the head portion detecting sensor 14 by a touch sensor may achieve a low cost detection of the head portion.

Furthermore, according to the aforementioned embodiment, the ECU 20 can stop the movement of the headrest front portion 12 when the head portion is detected, and can move the headrest front portion 12 to the fully open position when the head portion is not detected.

The present embodiment can be modified as follows. According to the present embodiment, the ECU 20 drives the motor 13 so as to move the headrest front portion 12 to the fully closed position 12A each time when the number of times the power is supplied to the headrest apparatus 10 exceeds the N value, and each time the headrest front portion 12 is operated. However, the motor 13 may be driven to move the headrest front portion 12 at the other timing. For example, the ECU 20 controls the motor 13 so that the headrest front portion 12 moves to the fully closed position 12A at regular time intervals. The motor 13 is driven the appropriate number of times in response to an operation condition of the headrest front portion 12 so as to relocate the not fully retracted headrest front portion 12 to the fully closed position 12A. Then, the motor 13 is driven at an appropriate timing in response to the operation condition of the headrest front portion 12 so as to relocate the not fully retracted headrest front portion 12 to the fully closed position 12A. In addition, the motor 13 is only driven the number of times needed, thereby improving durability of the headrest apparatus 10.

Further, according to the aforementioned embodiment, when the power is supplied to the headrest apparatus 10, the ECU 20 determines whether or not the headrest front portion 12 was operated the last time the power was supplied to the headrest apparatus 10. Then, the ECU 20 controls the motor 13, based on the determination result, to move the headrest front portion 12 to the fully closed position 12A. However, this process may be performed at the other timing. For example, the process may be performed before the ignition switch is turned off after the headrest front portion 12 is operated, i.e. before the power to the headrest apparatus 10 is turned off.

The timing for retracting the headrest front portion 12 may be changed, so as to respond to an operating time of the headrest apparatus 10. For example, in the cases where the operating time of the headrest apparatus 10 increases and thus a rate of occurrence that the headrest front portion is not fully retracted increases, the number of times the motor 13 is driven may be brought to increase so as to move the headrest front portion 12 to the fully closed position 12A. Then, the front portion 12 can surely return to the fully closed position 12A.

According to the aforementioned embodiment, when the motor 13 is driven to move the headrest front portion 12 to the fully closed position 12A, the CPU 21 brings the motor 13 to stop moving the headrest front portion 12 after the predetermined time has elapsed. However, the fact that the headrest front portion 12 has reached the fully closed position 12A can be determined by the other method. For example, it may be determined whether or not a lock current is detected from the motor 13.

Further, according to the aforementioned embodiment, the headrest front portion 12 is brought to move by the motor 13. However, as long as the headrest front portion 12 is movable between the fully closed position 12A and the fully open position 12B, the headrest front portion 12 can be constituted to operate in other manners. For example, the operation of the headrest front portion 12 can be achieved by a spring type or a solenoid type.

Furthermore, according to the aforementioned embodiment, the vehicle seat 1 equipped with the headrest apparatus 10 is applied to a passenger side seat of a vehicle. However, the vehicle seat 1 can be applied to a driver side seat, a rear seat, or the other seat of a vehicle.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A headrest apparatus for a vehicle, comprising:
a headrest rear portion supported by a seatback;
a headrest front portion movable between a fully closed position in which the headrest front portion is close to the headrest rear portion, and a fully open position in which the headrest front portion is away from the headrest rear portion;
a driving means for moving the headrest front portion; and
a controlling means for controlling the driving means so as to move the headrest front portion to the fully closed position after the headrest front portion is moved to the fully open position, the controlling means being configured to control the driving means so as to move the headrest front portion to the fully closed position at a predetermined timing even in a case where previously the headrest front portion is not moved to the fully open position.

2. A headrest apparatus according to claim 1, wherein the predetermined timing is based on a number of times that power is supplied to the headrest apparatus, wherein the controlling means controls the driving means so as to move the headrest front portion to the fully closed position when the number of times power is supplied to the headrest apparatus exceeds a predetermined value.

3. A headrest apparatus according to claim 2, wherein the power supply to the headrest apparatus is performed by an operation of an ignition switch.

4. A headrest apparatus according to claim 3, wherein the controlling means counts a number of times of turning on the ignition switch.

5. A headrest apparatus according to claim 4, wherein when the number of times of turning on the ignition switch fails to exceed the predetermined value and the headrest front portion was operated last time the power was supplied to the headrest apparatus, the headrest front portion retracts to the fully closed position.

6. A headrest apparatus according to claim 2, wherein the controlling means determines, at a time when power is supplied to the headrest apparatus, whether or not the headrest front portion was moved forward the last time power was supplied to the headrest apparatus; and when the controlling means determines that the headrest front portion was moved forward the last time power was supplied to the headrest apparatus, the controlling means controls the driving means to move the headrest front portion to the fully closed position even when the number of times that the power is supplied to the headrest apparatus fails to exceed the predetermined value.

7. A headrest apparatus according to claim 1, wherein the controlling means controls the driving means so as to move the headrest front portion to the fully closed position after the headrest front portion is brought to move towards the fully open position and then towards the fully closed position.

8. A headrest apparatus according to claim 1, wherein the controlling means controls the driving means so as to move the headrest front portion to the fully closed position at regular time intervals.

9. A headrest apparatus according to claim 1, further comprising:
a head portion detecting means for detecting whether or not a head portion of an occupant seated on a vehicle seat makes contact with the headrest front portion; the head portion detecting means being provided on the headrest front portion, and
the controlling means stopping a movement of the headrest front portion when the head portion is detected by the head portion detecting means.

10. A headrest apparatus according to claim 9, wherein the head portion detecting means is a touch sensor.

11. A headrest apparatus according to claim 9, wherein the controlling means stops the headrest front portion from fully opening when the head portion is detected, and moves the headrest front portion to the fully open position when the head portion fails to be detected.

12. A headrest according to claim 1, further comprising a head portion detecting sensor and a rear-end collision determining means for predicting or detecting a rear-end collision of the vehicle, wherein when the rear-end collision determining means predicts or detects an occurrence of a rear-end collision, the controlling means controls the driving means to move the headrest front portion in a forward direction to the fully open position and to stop the movement of the headrest front portion in the forward direction based on a detecting signal from the head portion detecting sensor, and thereafter to move the headrest front portion to the fully closed position.

* * * * *